Oct. 1, 1940.    P. McK. DEELEY    2,216,186
ELECTROLYTIC CONDENSER
Filed Jan. 24, 1939

INVENTOR.
Paul McKnight Deeley
BY
ATTORNEY

Patented Oct. 1, 1940

2,216,186

UNITED STATES PATENT OFFICE 2,216,186

ELECTROLYTIC CONDENSER

Paul McKnight Deeley, Plainfield, N. J., assignor to Cornell-Dubilier Electric Corporation, South Plainfield, N. J., a corporation of New York Application January 24, 1939, Serial No. 252,565

7 Claims. (Cl. 175—315)

The present invention relates to electrolytic condensers which depend for their action upon the dielectric or oxide film which may be formed electrolytically upon the surface of certain metals such as aluminum foil or plates serving as the electrodes in a condenser. This dielectric film due to its microscopic thickness which may be controlled easily during the forming process makes it possible to obtain considerable electric capacity in a condenser structure of given size and bulk compared with condensers employing other types of dielectric such as mica or paper, it being well understood by those skilled in the art that the capacity of an electrical condenser is directly proportional to the metallic surface area of the electrode elements separated by the dielectric and inversely to the thickness of the dielectric or spacing distance between the electrodes.

In an effort to further increase the capacity of electrolytic condensers of the above type, it has become customary to increase the effective electrode area by mechanically roughening or chemically etching the electrode surface prior to the forming of the dielectric film thereon. In this manner the surface of an electrode thus treated is increased through the production of minute craters or indentations, the surfaces of which are subsequently coated with the anodic or dielectric film resulting in a considerable capacity increase as compared with a non-etched or smooth foil having equal superficial dimensions.

In order to obtain a substantial surface increase of an electrode by means of etching methods now being used in practice it is necessary to produce deep craters or indentations by the etching chemicals. If a metal foil is used as electrode material the thickness must be at least twice the depth of the craters or indentations, thus making it necessary to increase the foil thickness compared with electrode foil which may be used if no etching is employed. Thus, for instance, a foil of about .005″ thickness was found to yield about five times the capacity in a finished condenser compared with the capacity of a condenser of like bulk and size employing non-etched foil of about .001″ thickness.

In the fabrication of electrolytic condensers of the aforementioned type it is the custom to either space the electrodes separated by an electrolyte by means of solid insulating positioning or spacing elements as in the case of so-called wet condensers employing a liquid electrolyte or to provide a fibrous or absorbent interlay such as of gauze or paper separating a pair of flexible electrode foils or strips and acting both as a mechanical separator and as a carrier for a viscous or semi-liquid electrolyte absorbed therein by impregnation. The latter type of condenser is known as a dry or semi-dry condenser and is usually constructed in rolled or convolute form and mounted in a suitable container. When the electrodes are thus rolled or otherwise folded to occupy a small space, it is necessary that the foil be sufficiently flexible and as a result the thickness of the foil is limited. This in turn entails a limitation of the amount or depth of etch obtainable, the latter being approximately proportional to the foil thickness as is readily understood from the above.

Moreover, in order to obtain a deep etch or large effective surface increase numerous difficulties are encountered in practice especially during the formation of a dielectric film on an etched foil. One of these difficulties is due to the fact that etching chemicals such as acids or other objectionable residues produced as an incident to or as a result of the etching have to be removed from within the minute craters or cavities in the electrode surface before an efficient dielectric film can be formed anodically. Furthermore, if a film of greater thickness is formed as required for condensers intended to operate at high voltages, the craters or cavities are often filled in with the dielectric or oxide material thus causing a loss in capacity and defeating the very purpose to be obtained by the etching. Other difficulties are encountered in obtaining the proper electrolyte for use in the finished condensers capable of penetrating into the small cavities or craters of the electrode. Spaces or voids between the electrodes not filled with electrolyte solution will cause both a reduction of the capacity and impairment of the operating characteristics of the condenser such as increase of its internal resistance or electrical losses incurred during operation in addition to other well known defects.

It has heretofore already become known to fold or pleat a more or less flexible sheet-like electrode in an effort to accommodate a maximum of electrode surface or capacity within a given mounting space, more particularly in condensers of the type using a wet or liquid electrolyte disposed between the electrodes. In these constructions the width of the pleats or folds in relation to the thickness of the electrode sheet and the number of pleats per unit length of the electrode structure were such that the electrode element obtained formed a rigid or semi-rigid, more or less self-supporting unit as distinguished from a foil-like or flexible electrode element which may be rolled, folded, or otherwise assembled into a compact unit together with other cooperating condenser elements such as in the fabrication of dry condensers of the wound type as described above.

An object of the present invention is to provide a flexible electrode structure having the characteristics of an ordinary flexible foil electrode and which in addition has all the advantages of an etched electrode especially as regards increase of effective surface area, thereby completely avoiding the difficulties and drawbacks incident to and the expenses involved in chemical or electro-chemical etching commonly employed in present-day practice.

Another object is to provide an electrode structure for electrolytic condensers which while providing a substantial surface increase without etching may be assembled such as rolled or folded together with other condenser elements or strips in substantially the same manner as a plain flexible foil strip.

Another object is to provide a condenser of the above type which shall be adapted for the use of extremely thin metal foil electrode without the mechanical difficulties involved in the use of such foil with the present electrode and condenser structures.

A further object is to provide a condenser of the above type which shall be adapted for the use of extremely thin metal foil electrode on the order of .001 inch or less.

Still a further object is the provision of a condenser of the above type so compact in construction as to render it suitable for use in a restricted space afforded by modern radio receiving sets and like apparatus.

The above and further objects of the invention will become more apparent from the following description taken with reference to the accompanying drawing forming part of this specification and wherein.

Similar reference characters denote similar parts in the different views of the drawing.

With the above objects in view, the invention contemplates the use of an extremely thin electrode foil or strip of aluminum or other film forming metal, practically having a thickness of the order of about .001 inch or less, which foil or strip is crimped, pleated, or folded back and forth in zigzag fashion with the width of the pleats or folds being a relatively small multiple of the foil thickness, practically about ten to twenty times the foil thickness, and the pleats being compressed to be closely adjacent to each other in such a manner as to obtain a structure which when viewed by the naked eye resembles a continuous though rough sheet or foil of great flexibility in a direction at right angles to the pleats or folds. A foil or strip constructed in this manner has a greatly increased all-over surface area compared with a plain ordinary electrode of similar superficial dimensions and if formed with a dielectric film will yield a considerable capacity increase.

Moreover, a structure of this type may be folded or wound together with other condenser elements into a condenser unit in substantially the same manner as an ordinary plain or smooth foil. Satisfactory results were obtained with an electrode consisting of thin foil having a thickness of .001 inch with the pleats or folds having a width of about .010 to .020 inch and being compressed to obtain about 200 or more pleats or folds per inch of electrode length. If a foil of lesser thickness is used the surface may be further increased as is understood. With foil of .001 inch thickness and with the pleats or folds having a width of about .012 inch and being compressed to obtain about 200 pleats or folds per inch of electrode length, it was possible to obtain a capacity increase in a condenser of about five to six times compared with a condenser using unpleated or plain foil of equal superficial dimensions and bulk.

Figure 1:
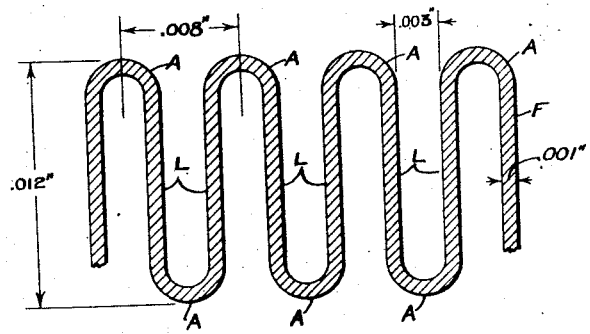
Figure 1 shows on a greatly exaggerated scale a cross-section through an electrode structure according to the invention.

Referring to Figure 1 of the drawing, there is shown on a greatly exaggerated scale a pleated or crimped electrode structure according to the invention with the numerical values to obtain a surface increase of about three times (about 125 pleats per unit of electrode length) indicated in the drawing. The foil or strip F is bent back and forth in accordion or bellows fashion with adjacent intermediate portions L of the pleats or folds being substantially parallel or in practice bulging inwardly and appearing to closely touch each other to the naked eye. Actually, however, the pleats or folds are spaced sufficiently to accommodate an adequate supply of electrolyte within the spaces therebetween to ensure proper functioning of a condenser embodying an electrode of this type. Similarly, the outer portions or apices A of the pleats are contiguous to each other in such a manner as to present the appearance of a continuous though roughened surface S as indicated by the dotted line in the Figure 2b.

Figure 4:
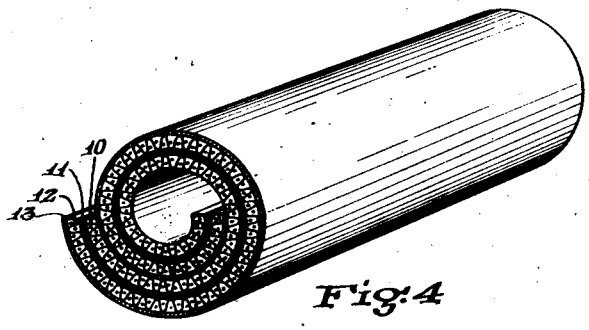
Figure 4 is an isometric view of a wound condenser unit embodying an anode constructed in accordance with the invention.
Figure 3:
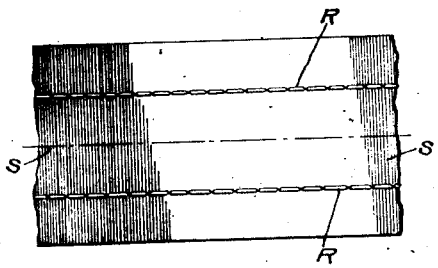
Figure 3 is a top plan view showing the appearance of an electrode structure or strip made in accordance with the invention.

The main distinction of a strip or foil-like structure of the afore-described type over the known rigid or semi-rigid pleated electrode units wherein adjacent pleats include a substantial angle is due to the fact that a structure of the type described is highly flexible in a direction at right angle to the pleats or folds thus allowing for folding or rolling in substantially the same manner as with a plain flexible strip or foil. Such a condenser of the rolled type embodying the inventive structure as the anode electrode is shown in Figure 4 to be described hereafter.

To ensure sufficient flexibility and a foil-like character of a structure according to the invention, certain pre-requisites have to be complied with as follows from the foregoing, viz., the employment of both an extremely thin foil, a limit ratio between the thickness of the foil used and the width of the pleats as well as sufficient compression of the pleats or provision of a minimum number of pleats per unit length of the completed electrode structure such as in the case of the above numerical example.

Figure 2A:
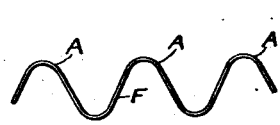
Figures 2a and 2b illustrate on a smaller but still exaggerated scale one way of producing an electrode according to Figure 1.
Figure 2B:

One suitable manner of producing an electrode structure of the aforesaid type consists in passing a plain foil strip F between a pair of profiled gears or the like to produce a corrugated structure as shown in Figure 2a whereupon the latter is compressed or squeezed such as by holding or gripping one portion and pushing the rest against the held portion thereby obtaining a structure as shown in Figure 2b.

As will be understood from the above, the thinner the foil used the greater will be the gain in surface area for a given volume or mounting space of the electrode. Obviously, an extremely thin foil of the type used by the invention will have reduced mechanical strength so that the compressed pleats will tend to stretch or become separated from each other if subjected to mechanical stress such as during the movement of the strip through the forming or other treating tanks or when folding or rolling the electrode during assembly into a condenser unit. In order therefore to prevent the pleats or folds in the electrode structure from separating or stretching there is provided according to a further feature of the invention means to keep the pleats in proper relation. This is accomplished by joining adjacent pleats such as by welding them together or by a rolling or bending operation to inter-lock adjacent pleats and prevent separation or stretching of the electrode structure.

According to a preferred method, the pleats are sewed together such as with ordinary linen or cotton thread preferably by means of what is known as a lock stitch connection, the sewing being carried out substantially perpendicularly to the pleats or folds, i. e. longitudinally of the electrode strip such as shown at R in Figure 4 wherein there is shown a top view of a strip or electrode structure of substantially actual size constructed according to the invention. A strip thus reinforced by sewing or in any other suitable manner may be drawn through the different forming and treating tanks for producing the dielectric or oxide film in accordance with any one of the methods well known in the art without the danger of the structure becoming stretched or the pleats separated from each other. Alternatively, the foil may be formed before the pleating operation in which case the sewing connection or other reinforcement serves to keep the pleats or folds in proper relation during the winding or folding of the electrode structure in assembling it with other elements into a condenser unit.

The foil structure or strip is preferably sewed or stitched in parallel rows spaced by distances of approximately one inch. If desired, the sewing may be carried out in a larger number of rows at closer distances and the threads used as spacers to separate the electrode from an adjacent cooperating electrode.

Referring to Figure 4 there is illustrated a rolled condenser structure comprising in a known manner a pair of electrodes one of which as shown at 11 is film formed (anode) and constructed according to the invention, while the other electrode 13 (cathode) in the example shown consists of smooth or non-pleated foil. In the drawing the pleats of the electrode 11 have been shown exaggerated for the sake of illustration, there being used a substantially greater number thereof per unit of electrode length as described hereinbefore.

Both electrodes are spaced by absorbent or fibrous separating strips 12 and 10 such as paper, gauze, etc., and wound into a convolute condenser unit or roll. The latter after completion of the winding operation may be impregnated with a suitable electrolyte serving to conduct the electric current to and from the electrodes and to maintain the dielectric film during the operation of the condenser in a manner well understood by those skilled in the art. The unit may be mounted in a suitable container of metal or cardboard with terminal leads or tabs being attached to the electrodes for connecting the condenser in an electrical circuit. The connecting tabs may be produced in a known manner by cutting the electrode strip cross-wise to its length and bending outwardly the cut portion to form a tab or alternatively a separate tab may be used attached to the electrode by welding, sewing, staking or any other suitable method.

The electrode structure proposed by the invention has special advantages for condensers intended for use under high operating voltages. If an oxide film of substantial thickness is formed upon an electrode of the type described the oxide will tend to stretch the pleats or folds due to the great resiliency of the latter thereby substantially avoiding a filling up or clogging of the spaces or interstices between the pleats by the oxide material as is true with the ordinary etched type anode where the craters or cavities in the electrode surface are often filled with the dielectric resulting in substantial capacity decrease and other defects as pointed out hereinabove. A further advantage of a foil structure proposed by the invention is the fact that due to the close distance between adjacent pleats or folds the electrolyte in the completed condenser unit is retained within the spaces and interstices enclosed by the pleats by a sort of capillary action resulting in improved performance and efficiency as well as an increased life of the condenser.

As previously described the cathode in a completed condenser unit may consist of smooth or plain foil as shown in Figure 4 or it may be a structure similar to the anode to provide a large contact area between the electrolyte and the cathode surface to decrease the internal resistance and electrical losses of the condenser. It is furthermore understood that a condenser comprising two electrodes of the type described by the invention both formed with an anodic film may be employed for use in alternating current circuits or in a direct current circuit without regard to polarity in a manner well known.

It is furthermore possible to etch the electrode either before or after completion of the folding operation. For this purpose it it not necessary to carry out a deep etch with the attendant practical difficulties above pointed out, but only a slight surface etch may be employed obtained in a relatively simple manner. Thus if employing a two-fold increase by etching, the resultant surface increase will be about 12 times in the above example which is not possible by using any one of the processes and methods heretofore known and employed in the art.

It will be evident from the above that the invention is not limited to the specific details and construction shown herein for illustration but that it is possible to make alterations differing from the specific embodiment shown and coming within the broader scope and spirit of the invention as defined in the appended claims.

I claim:

1. An electrode structure for electrolytic condensers consisting of thin pleated metal foil, the width of the pleats in relation to the foil thickness and the number of pleats per unit of electrode length being such as to produce a continuous sheet-like structure of great flexibility at right angle to the pleats, and means for joining adjacent pleats of said structure to prevent stretching thereof when subjected to mechanical stress.

2. An electrode structure for electrolytic condensers consisting of thin pleated metal foil, the width of the pleats in relation to the foil thickness and the number of pleats per unit of electrode length being such as to produce a continuous sheet-like structure of great flexibility at right angle to the pleats, and means for interlocking adjacent pleats of said structure to prevent stretching thereof when subjected to mechanical stress.

3. An electrode structure for electrolytic condensers consisting of thin pleated metal foil, the width of the pleats in relation to the foil thickness and the number of pleats per unit of electrode length being such as to produce a continuous sheet-like structure of great flexibility at right angle to the pleats, and at least one thread forming a continuous line of stitches interconnecting adjacent pleats of said structure.

4. An electrode structure for electrolytic condensers consisting of thin pleated metal foil, the width of the pleats in relation to the foil thickness and the number of pleats per unit of electrode length being such as to produce a continuous sheet-like structure of great flexibility at right angles to the pleats, and a plurality of threads forming continuous parallel lines of stitches substantially at right angle to said pleats to interlock adjacent pleats of said structure.

5. An electrode structure for use in electrolytic condensers consisting of thin pleated metal foil of the order of .001 inch thickness, the pleats of said foil having a width of the order of .01 to .02 inch and being compressed to form a continuous sheet-like structure of great flexibility at right angle to the pleats, and at least one thread of fibrous material sewed to form a continuous line of stitches interlocking adjacent pleats of said structure to prevent stretching thereof when subjected to mechanical stress.

6. An electrode structure for use in electrolytic condensers consisting of thin pleated metal foil of the order of .001 inch thickness, said foil having an etched surface to increase its effective electrode area, the pleats of said foil having a width of the order of .01 to .02 inch and being compressed to form a continuous sheet-like structure of great flexibility at right angle to the pleats, and at least one fibrous thread forming a continuous line of stitches substantially at right angle to said pleats to interlock adjacent pleats of said structure.

7. An electrode structure for use in electrolytic condensers consisting of thin pleated metal foil of the order of .001 inch thickness, said foil having an etched surface to increase its effective electrode area, the pleats of said foil having a width of the order of .01 to .02 inch and being compressed to form a continuous sheet-like structure of great flexibility at right angle to the pleats, and a plurality of fibrous threads forming continuous lines of stitches substantially at right angle to said pleats to interlock adjacent pleats of said structure.

PAUL McKNIGHT DEELEY.